(12) United States Patent
Supino (10) Patent No.: US 7,515,373 B1
(45) Date of Patent: Apr. 7, 2009

(54) TRANSDUCER POSITIONING RESPONSIVE TO COMPLEX POSITION ERROR SIGNAL

(75) Inventor: Louis Supino, Niwot, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/863,337

(22) Filed: Sep. 28, 2007

(51) Int. Cl.
*G11B 5/596* (2006.01)
(52) U.S. Cl. .................................. 360/77.04
(58) Field of Classification Search ........................ None
See application file for complete search history.

(56) References Cited

U.S. PATENT DOCUMENTS

| | | | | |
|---|---|---|---|---|
| 4,908,722 A | * | 3/1990 | Sonobe | 360/46 |
| 5,550,685 A | * | 8/1996 | Drouin | 360/77.08 |
| 6,564,110 B1 | | 5/2003 | Makino et al. | |
| 6,567,233 B1 | | 5/2003 | Chew et al. | |
| 6,580,579 B1 | | 6/2003 | Hsin et al. | |
| 6,710,966 B1 | | 3/2004 | Codilian et al. | |
| 6,937,424 B2 | * | 8/2005 | Chang et al. | 360/77.04 |
| 7,116,513 B1 | | 10/2006 | Sun et al. | |
| 7,372,660 B1 | * | 5/2008 | Subrahmanyan | 360/78.09 |
| 2003/0011914 A1 | | 1/2003 | Angelo et al. | |

\* cited by examiner

*Primary Examiner*—K. Wong
(74) *Attorney, Agent, or Firm*—Myers Bigel Sibley & Sajovec, P.A.

(57) ABSTRACT

Positioning of a transducer is controlled in response to real and imaginary component signals that are formed from a position error signal (PES) which is indicative of the transducer location on a media.

14 Claims, 7 Drawing Sheets

TRANSDUCER POSITIONING RESPONSIVE TO COMPLEX POSITION ERROR SIGNAL

BACKGROUND

The present invention generally relates to controlling transducer movement and, more particularly, to controlling transducer movement responsive to a position error signal.

Disk drives are digital data storage devices which can enable users of computer systems to store and retrieve large amounts of data in a fast and efficient manner. A typical disk drive includes a plurality of magnetic recording disks which are mounted to a rotatable hub of a spindle motor and rotated at a high speed. An array of read/write heads is disposed adjacent surfaces of the disks to transfer data between the disks and a host computer. The heads can be radially positioned over the disks by a rotary actuator and a closed loop servo system, and can fly proximate the surfaces of the disks upon air bearings.

A plurality of nominally concentric tracks can be defined on each disk surface. A preamp and driver circuit generates write currents that are used by the head to selectively magnetize areas of the tracks during a data write operation and amplifies read signals detected by the head during a data read operation. A read/write channel and interface circuit are connected to the preamp and driver circuit to transfer the data between the disks and the host computer.

The servo system can operate in two primary modes: seeking and track following. During a seek, a selected head is moved from an initial track to a target track on the corresponding disk surface. The servo system applies a current command signal to an actuator coil to accelerate the head toward the target track. During the seek, the servo system can measure the location of the head as it moves across the disk based on servo data that is recorded on the disk, and can adjust the current command signal in response to the location measurements. As the head approaches the target track, the servo system decelerates the head to bring it to rest over the target track. Thereafter, the servo system enters the track following mode wherein the head is maintained over the center of the target track while data is written/read.

Vibration of the disk drive can cause the head to have an across-track vibration, which can affect the ability of the servo system to maintain the head on a track during a track following operation. The servo system can be configured to attempt to compensate for a worst-case amount of vibration, within design constraints, that the head may experience while in a track following operation on various tracks across the disk. However, optimizing the servo system for worst-case vibration conditions may provide less than optimal performance (e.g., less input/output of data throughput than otherwise possible) in non-vibration conditions.

SUMMARY

In some embodiments, real and imaginary component signals are formed from a position error signal (PES) which is indicative of a transducer location on a media. Positioning of the transducer is controlled in response to the real and imaginary component signals.

In some other embodiments, a circuit forms real and imaginary component signals from the PES, and controls positioning of the transducer in response to the real and imaginary component signals.

In yet some other embodiments, a vibration determination circuit forms separate real and imaginary component signals from the PES, and determines frequency of a vibration induced excitation of the PES in response to the real and imaginary component signals. An actuator control circuit controls positioning of the transducer in response to the determined vibration frequency.

DETAILED DESCRIPTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for positioning of any type of transducer in response to a position error signal that is indicative of a location of the transducer relative to a media. Accordingly, while the transducer may be a head and the media may be a data storage disk within a disk drive, the terms transducer and media are not limited thereto.

Figure 1:
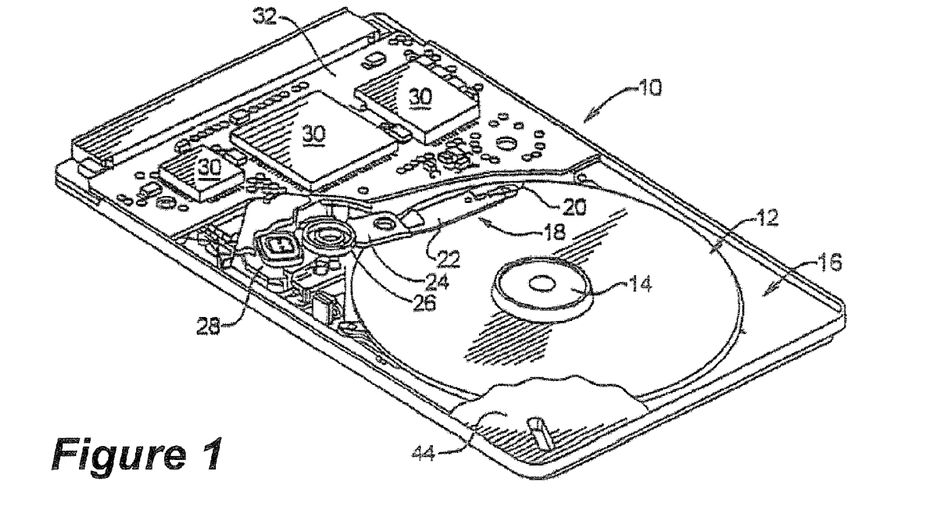
FIG. 1 is a perspective view of a disk drive with electronic circuits that are configured in accordance with at least some embodiments of the present invention.

A simplified diagrammatic representation of a disk drive, generally designated as 10, is illustrated in FIG. 1. The disk drive 10 includes at least one disk or disk stack 12 (illustrated as a single disk in FIG. 1) that is rotated by a spindle motor 14. The spindle motor 14 is mounted to a base plate 16. An actuator 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and retrieve data in the disk drive 10.

The actuator 18 includes a head 20 (or transducer) mounted to a flexure arm 22 which is attached to an actuator arm 24 that can rotate about a pivot bearing assembly 26. The head 20 may, for example, include a magnetoresistive (MR) element and/or a thin film inductive (TFI) element. The actuator 18 also includes a servo motor 28 (e.g., voice coil motor (VCM)) which moves the head 20 relative to the disk stack 12. The spindle motor 14 and servo motor 28 are coupled to controllers, read/write channel circuits, and other associated electronic circuits 30 which can be enclosed within one or more integrated circuit packages mounted to a printed circuit board (PCB) 32. The controllers, read/write channel circuits, and other associated electronic circuits 30 are referred to below as "controllers and other circuits" for brevity. The controllers and other circuits 30 may include analog circuitry and/or digital circuitry, such as a gate array and/or microprocessor-based instruction processing device(s) (e.g., general purpose microprocessor and/or digital signal processor).

Figure 2:
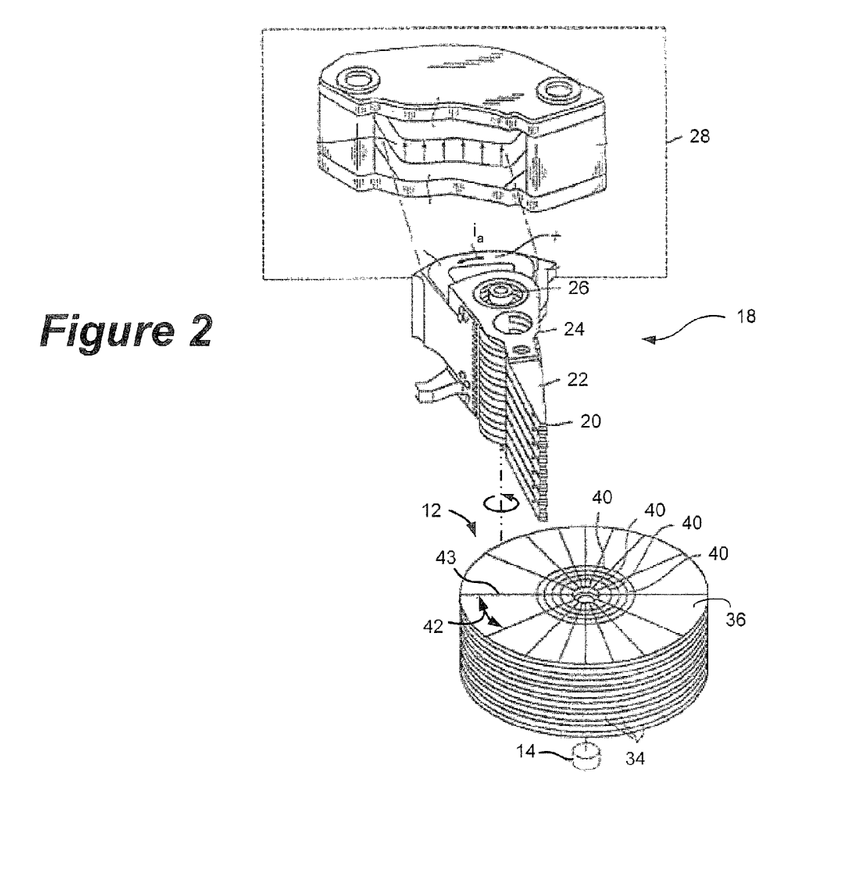
FIG. 2 is a block diagram of an exemplary head disk assembly of the disk drive.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 14.

The actuator 18 includes a plurality of the heads 20, each of which is positioned to be adjacent to a different one of the disk surfaces 36. Each head 20 is mounted to a corresponding one of the flexure arms 22. The servo motor 28 operates to move the actuator arm 24, and thus moves the heads 20 relative to their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks and spokes on the disks 34. Data is stored on the disks 34 within a number of concentric tracks 40 (or cylinders). Each track 40 is divided into a plurality of radially extending sectors 42. Each sector is further divided into a servo sector and a data sector. The servo sectors of the disks 34 are used to, among other things, accurately position the head 20 so that data can be properly written onto and read from a selected one of the disks 34. Exemplary servo data that may be stored in at least some of the servo sectors may include, for example, a DC erase field, a preamble field, a servo address mark (SAM) field, and a servo burst field of circumferentially staggered radially offset servo bursts (e.g., A, B, C, D servo bursts). The data sectors are where non-servo related data (i.e., host device data) is stored and retrieved.

Figure 3:
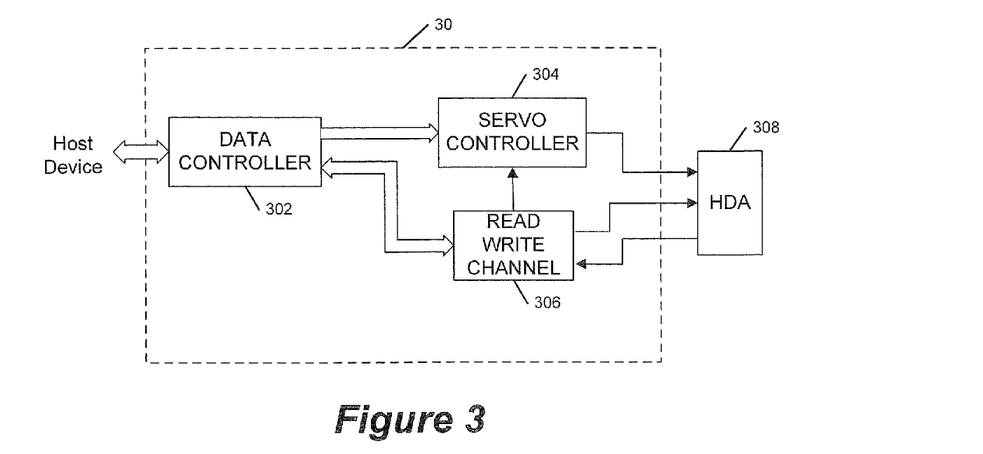
FIG. 3 is a block diagram of a portion of the controllers and other electronic circuits of the disk drive shown in FIG. 1, and which are configured in accordance with some embodiments of the present invention.

FIG. 3 is a block diagram of a portion of the controllers and other circuits 30 of the disk drive 10 shown in FIG. 1, according to some embodiments, and which can be communicatively connected to a host device. The controllers and other circuits 30 can include a data controller 302, a servo controller 304, and a read write channel 306. Although two separate controllers 302 and 304 and a read write channel 306 have been shown for purposes of illustration and discussion, it is to be understood that their functionality described herein may be integrated within a common integrated circuit package or distributed among more than one integrated circuit package. The head disk assembly (HDA) 308 can include a plurality of the disks 34, the actuator 18 with a plurality of heads 20 positioned adjacent to different data storage surfaces of the disks 34, the servo motor 28, and the spindle motor 14.

Write commands and associated data from the host device 60 are buffered by the data controller 302. The data controller 302 carries out buffered write commands by formatting the associated data into blocks with the appropriate header information, and transfers the formatted data via the read/write channel 306 to logical block addresses (LBAs) on the disk 34 identified by the associated write command.

The read write channel 306 can convert data between the digital signals processed by the data controller 302 and the analog signals conducted through the heads 20 in the HDA 308. The read write channel 306 provides servo data read from the HDA 308 to the servo controller 304. The servo data can be used to detect the location of the head 20 in relation to LBAs on the disk 34. The servo controller 304 can use LBAs from the data controller 302 and the servo data to seek the head 20 to an addressed track and block on the disk 34, and to maintain the head 20 aligned with the track while data is written/read on the disk 34.

The servo controller 304 regulates the current command signal ($i_a$ of FIG. 2) supplied to the servo motor 28 of the actuator 18 to carry out a seek operation in which a selected head 20 is moved to a target track on the corresponding disk 34 and then settled into alignment with the target track so data can be written and/or read.

Vibration of the disk drive 10 can cause the head 20 to have an across track vibration, which can affect the ability of the servo controller 304 to maintain the head 20 on a selected track during a track following operation. In accordance with some embodiments, the servo controller 304 can determine the frequency and amplitude of the vibration, and can compensate for the determined vibration characteristics, within design constraints, so that the head 20 may remain on-track.

Figure 4:
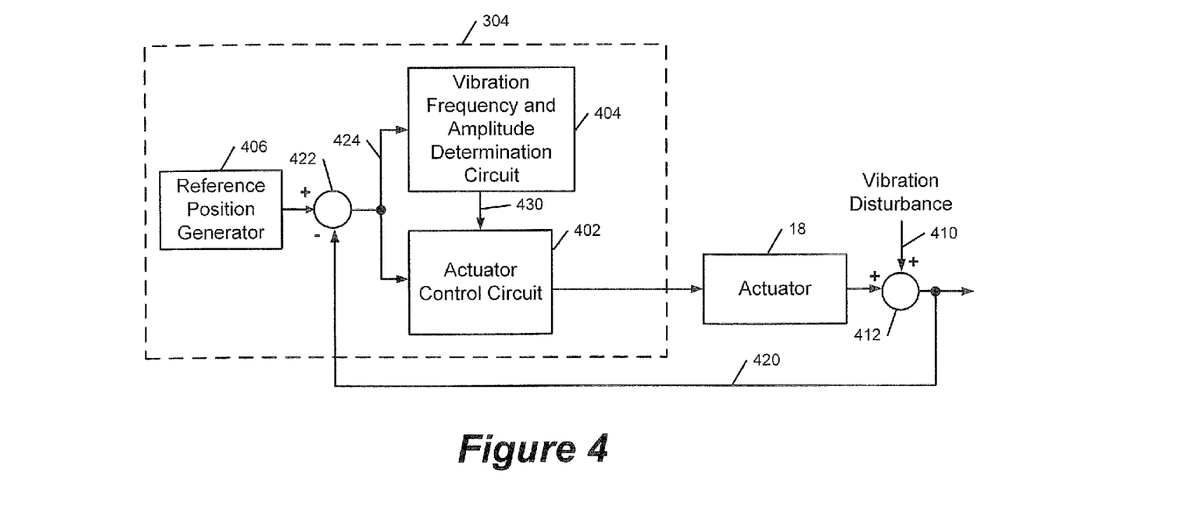
FIG. 4 is a block diagram of the servo controller of FIG. 3 in accordance with some embodiments.

FIG. 4 is a block diagram of the servo controller 304 of FIG. 3 in accordance with some embodiments. Referring to FIG. 4, the servo controller 304 can include an actuator control circuit 402, a vibration frequency and amplitude determination circuit 404, and a reference position generator 406. During a track following operation, a read position signal 420 is generated by the head 20 as the servo patterns are read along the track, where the read position signal 420 indicates a relative position of the head 20 to the track. The sensed position of the head 20 is affected by the combined effects, illustrated by summing node 412, of positioning by the actuator 18 and vibration disturbances 410, such as external shocks on the disk drive 10, that induce vibration into the head 20 and/or the disk 34. Accordingly, the sensed position of the head 20 includes a component therein that is responsive to the vibration disturbance 410.

The read position signal 420 is fed-back to a summing node 422, where it is combined with a desired reference position signal from the reference position generator 406 to generate a position error signal (PES) 424. The desired reference position signal may be a DC value (e.g., static value), such as zero, for at least a portion of the revolution of the disks 34. The reference position generator 406 can be configured to drive the head 20 toward the centerline of a data track during track following, or to move the head 20 off-track during seeking.

The vibration frequency and amplitude determination circuit 404 generates complex real and imaginary components signals from the PES, and uses the real and imaginary PES components to determine frequency and amplitude values 430 of the vibration induced excitation of the PES. The actuator control circuit 402 regulates the current command signal ($i_a$ of FIG. 2) supplied to the servo motor 28 of the actuator 18 in response to the PES and in response to the determined frequency and amplitude values 430 of the vibration to attempt to maintain the head 20 on the selected track (e.g., attempt to regulate the current command signal to drive the PES to zero).

Figure 5:
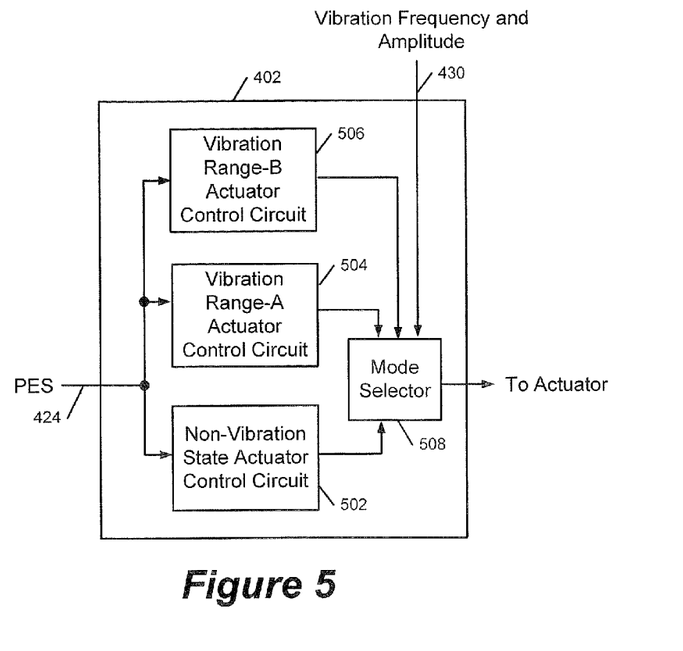
FIG. 5 is a block diagram of the actuator control circuit of FIG. 4 in accordance with some embodiments.

FIG. 5 is a block diagram of the actuator control circuit 402 of FIG. 4 in accordance with some embodiments. Referring to FIG. 5, the exemplary actuator control circuit 402 includes three actuator control circuits, namely, a non-vibration state actuator control circuit 502, a vibration range-A actuator control circuit 504, and a vibration range-B actuator control circuit 506, as well as a mode selector 508. The three actuator control circuits 502, 504, and 506 have different disturbance transfer functions (i.e., ratio of their output response to their input) relative to each other.

The non-vibration state actuator control circuit 502 can be configured to provide increased data throughput for reading and/or writing on the disk 34 while the head 20 and/or disk 34 are subjected to less than a threshold amplitude of vibration. In contrast, the vibration range-A actuator control circuit 504 can be configured to provide more robust track following (i.e., less data track misregistration TMR and reduced likelihood of read/write data errors) while the head 20 and/or disk 34 are subjected to at least the threshold vibration amplitude with a fundamental vibration frequency within a defined range A, compared to the non-vibration state actuator control circuit 502 and the vibration range-B actuator control circuit 506. The vibration range-B actuator control circuit 506 can be configured to provide more robust track following while the head 20 and/or disk 34 are subjected to at least the threshold vibration amplitude with a fundamental vibration frequency within a defined range B, compared to the non-vibration state actuator control circuit 502 and the vibration range-A actuator control circuit 504.

The mode selector 508 selects between the output of the non-vibration state actuator control circuit 502, the output of the vibration range-A actuator control circuit 504, and the output of the vibration range-B actuator control circuit 506 in response to the determined frequency and amplitude values 430 of the vibration. The mode selector 508 uses the selected output among the control circuits 502-506 to regulate the current command signal supplied to the servo motor 28 to position the head 20.

In an exemplary embodiment, when the determined vibration amplitude is less than a threshold level, the mode selector 508 selects and uses the output of the non-vibration state actuator control circuit 502 to regulate the current command signal supplied to the actuator 18. In contrast, when the determined vibration amplitude is greater than the threshold level and the fundamental vibration frequency is within the defined range-A, the mode selector 508 selects and uses the output of the vibration range-A actuator control circuit 504 to regulate the current command signal supplied to the actuator 18. Similarly, when the determined vibration amplitude is greater than the threshold level and the fundamental vibration frequency is within the defined range-B, the mode selector 508 selects and uses the output of the vibration range-B actuator control circuit 506 to regulate the current command signal supplied to the actuator 18.

To avoid a discontinuous change in the current command signal supplied to the actuator 18, the mode selector 508 may delay switching between the outputs of the control circuits 502-506 until the head 20 is being moved between tracks in a seek operation. The mode selector 508 may alternatively smoothly transition between the outputs of the control circuits 502-506 to provide a more continuous current command signal to the actuator 18. For example, the mode selector 508 may increase a contribution of the output from one of the control circuits 502-506 (e.g., 504) while decreasing the contribution of the output from the other two control circuits 502-506 (e.g., 502 and 506) to the current command signal. The mode selector 508 may therefore include a weighted combiner that varies the weighting applied to the separate contributions of the output from the control circuits 502-506 (e.g., 504) for the formation of the current command signal in response to the determined vibration frequency and amplitude.

Accordingly, the actuator control circuit 402 varies its vibration compensation scheme between those provided by the three control circuits 502-506 in response to the determined amplitude and frequency values 430 of the vibration. Positioning of the head 20 may thereby be controlled in a manner that is more optimized for the particular amplitude and frequency of the vibration, which may provide more robust track following and/or improved read/write data throughput as the head 20 and/or disk 34 are subjected to various vibration and non-vibration conditions that change over time.

Although the exemplary actuator control circuit 402 of FIG. 5 shows three different control circuits 502, 504, and 506, it is not limited thereto and may instead include any number of control circuits. Moreover, although the control circuits 502-506 have been shown in separate boxes in FIG. 5 for ease of illustration and explanation, they are not limited thereto and may instead be integrated within a common physical electronic device or may be distributed across any number of physical electronic devices. For example, the control circuits 502-506 can implemented within a common digital signal processor, general purpose processor, and/or ASIC.

In another exemplary embodiment, the actuator control circuit 402 may automatically adapt to respond to the determined amplitude and frequency values 430 of the vibration. For example, the transfer function of the actuator control circuit 402 may be modified to shift one or more zeros and poles of the transfer function thereof to overlap the determined vibration frequency and thereby at least substantially attenuate the affect of the vibration on the response of the actuator control circuit 402. The extent to which the zeros and poles of the transfer function are shifted toward the determined vibration frequency may be regulated in response to the determined vibration amplitude. For example, the transfer function of the actuator control circuit 402 may be modified so that a zero and pole thereof substantially overlaps, and thereby attenuates, the determined vibration frequency when the determined vibration amplitude exceeds a threshold level.

Figure 6:
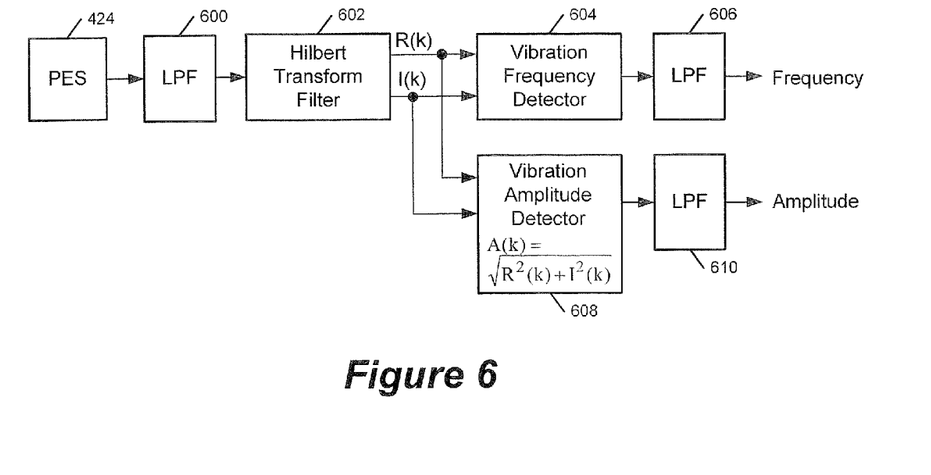
FIG. 6 is a block diagram of the vibration frequency and amplitude detection circuit of FIG. 4 in accordance with some embodiments.

FIG. 6 is a block diagram of the vibration frequency and amplitude determination circuit 404 of FIG. 4 in accordance with some embodiments. Referring to FIG. 6, the PES 424 is passed through a low pass filter (LPF) 600 and then to a Hilbert transform filter 602. The Hilbert transform filter 602 forms separate real R and imaginary I components signals from the PES 424. The Hilbert transform filter 602 generates the real R and imaginary I components signals from the filtered PES function S(t) in the continuous time domain based on the following Hilbert equation:

$$H(S) = \frac{1}{\pi} \int_{-\infty}^{\infty} \frac{S(\tau)}{t - \tau} d\tau,$$

where H(S) represents the Hilbert transform in continuous time domain, and τ represents period of the PES function S(t).

The Hilbert transform filter 602 may form separate real R(k) and imaginary I(k) components signals from the PES 424 in the discrete time domain, where k represents discrete sample times, based on the following Hilbert equations:

$$H(k) = \frac{2}{\pi} \left( \frac{\sin^2\left(\frac{\pi k}{2}\right)}{k} \right),$$

where H(k) represents the Hilbert transform in discrete time, and k represents sample times which are not equal to zero; and H(k)=0, when k is equal to zero.

As explained above, the Hilbert transform filter 602 forms separate real R(k) and imaginary I(k) component values from the PES 424 using the Hilbert transform H(k). The operation of a Hilbert transform filter to convert a signal into real and imaginary components is well known and, therefore, further description thereof is omitted for brevity.

The frequency detector circuit 604 uses the real R(k) and imaginary I(k) component values to generate a frequency value that indicates the frequency of the vibration induced excitation of the PES, and which is filtered by another LPF 606 to generate a filtered frequency value. An amplitude detector circuit 608 uses the real R(k) and imaginary I(k) component values to generate an amplitude value that indicates amplitude of the vibration induced excitation of the PES, and which is filtered by another LPF 610 to generate a filtered amplitude value. The filtered frequency and amplitude values can be used, as described above, to regulate the mode selector 508 in FIG. 5 and/or to adapt the actuator control circuit 402 so as to control the current command signal that is supplied to the actuator 18 so as to compensate for the vibration.

Figure 7:
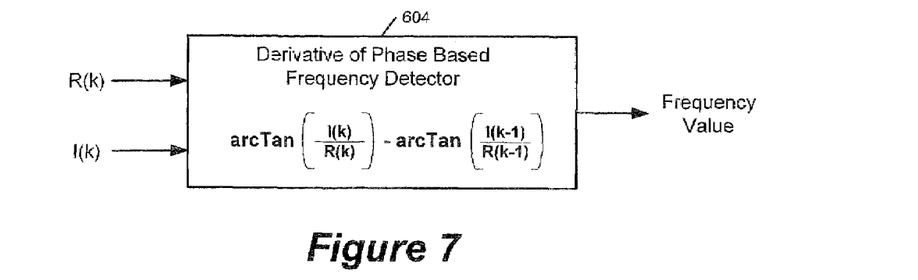
FIG. 7 is a block diagram of a phase derivative-based configuration of the frequency detection circuit of FIG. 4 in accordance with some embodiments.
Figure 8:
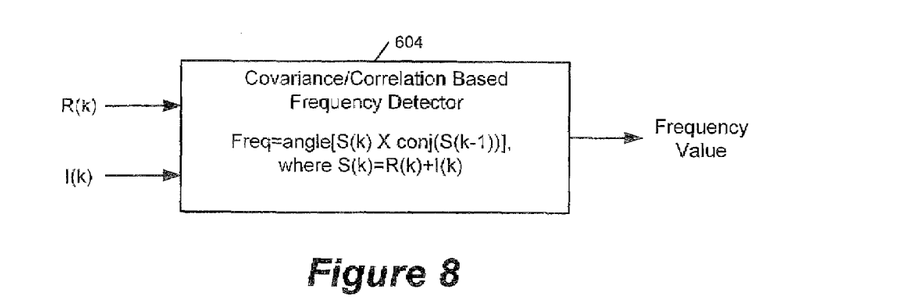
FIG. 8 is a block diagram of a covariance/correlation-based configuration of the frequency detection circuit of FIG. 4 in accordance with some embodiments.
Figure 9:
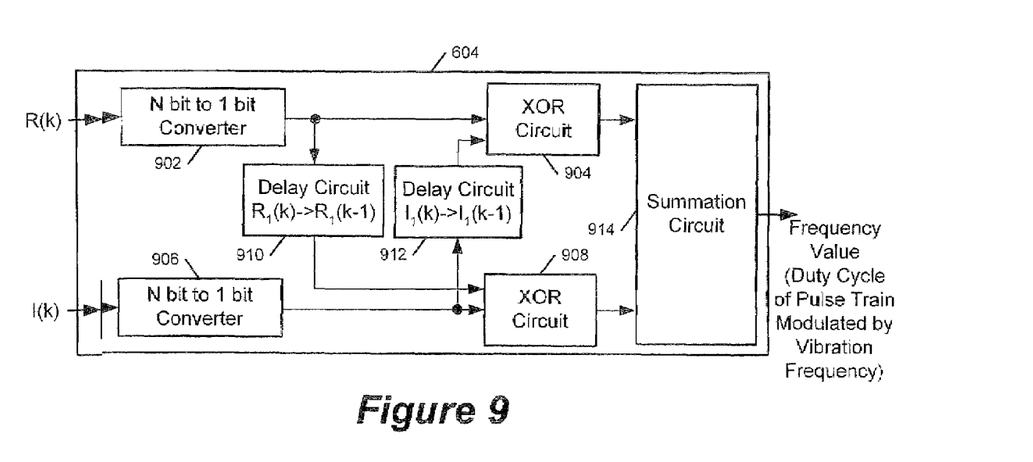
FIG. 9 is a block diagram of a single bit correlation-based configuration of the frequency detection circuit of FIG. 4 in accordance with some embodiments.

Three exemplary embodiments of the frequency detector 604 are now described with regard to FIGS. 7-9. FIG. 7 is a block diagram of a phase derivative-based configuration of the frequency determination circuit 604 of FIG. 4. Referring to FIG. 7, the frequency detector 604 can generate a frequency value based on the following phase derivative-based equation:

$$FrequencyEstimate = \arcTan\left(\frac{I(k)}{R(k)}\right) - \arcTan\left(\frac{I(k-1)}{R(k-1)}\right),$$

where I(k) represents the imaginary component of the PES value at sample time k, R(k) represents the real component of the PES value at sample time k, I(k−1) represents the imaginary component of the PES value at a previous sample time k−1, and R(k−1) represents the real component of the PES value at the previous sample time k−1.

Because the frequency determination circuit 604 of FIG. 7 determines frequency based on the derivative of the polar angles, when noise is present in the PES the determined frequency may have increased error relative to a noiseless PES. To decrease the effect of noise in the PES on the determined frequency, a covariance/correlation-based frequency determination approach, which is described below with regard to FIG. 8, may be carried-out.

FIG. 8 is a block diagram of a covariance/correlation-based configuration of the frequency detector 604 of FIG. 4. Referring to FIG. 8, the frequency detector 604 generates a frequency value based on the following covariance/correlation-based equation:

Frequency=angle[S(k)×ComplexConjugate(S(k−1))],
where S(k) represents the real and imaginary components at the sample time k (i.e., S(k)=R(k)+I(k)), ComplexConjugate (S(k−1)) represents the complex conjugate of the real and imaginary components at the previous sample time k−1 (i.e., R(k−1) and I(k−1)), and the polar angle of the product of S(k) and the complex conjugate of S(k−1) can be determined by as the argument of the product. Because the frequency determination circuit 604 of FIG. 8 determines frequency based on a derivative inside the polar angle, the presence of noise in the PES may have less effect on the accuracy of the determined frequency.

The effective signal to noise ratio, and associated accuracy of the frequency determination in the presence of a noisy PES, may be increased by low pass filtering the result of the product of S(k) and the complex conjugate of S(k−1), such as according to the following equation:

Frequency=angle[convolution(S(k)×ComplexConjugate (S(k−1)))], where convolution represents a low pass filter that filters the product S(k) over, for example, 5 to 10 of the sample times k.

FIG. 9 is a block diagram of a single bit correlation-based configuration of the frequency detector 604 of FIG. 4. Referring to FIG. 9, the real component value at sample time k is converted from an N-bit representation (e.g., one or more bytes) to a single bit real value ($R_1(k)$) by a N-bit-to-1-bit converter 902. Similarly, the imaginary component value at the sample time k is converted from an N-bit representation to a single bit imaginary value ($I_1(k)$) by a N-bit-to-1-bit converter 906. The N-bit-to-1-bit converters 902 and 906 may each carry out the N-bit to single bit conversions by comparing their respective N-bit component values to a threshold value, and selectively generating either a logical 0 or logical 1 value in response to the comparison (e.g., output 1 if the N-bit component value>threshold value, and output 0 if the N-bit component value<threshold value).

A first delay circuit 910 delays the single bit real value ($R_1(k)$) output from the converter 902 to generate a delayed single bit real value ($R_1(k-1)$). A second delay circuit 912 delays the single bit imaginary value ($I_1(k)$) output from the converter 906 to generate a delayed single bit imaginary value ($I_1(k-1)$).

A first exclusive OR (XOR) circuit 904 generates a first correlation output from an XOR operation on the single bit real value ($R_1(k)$) from the converter 902 and the delayed single bit imaginary value (I(k−1)) from the delay circuit 912. A second exclusive OR (XOR) circuit 908 generates a second correlation output from an XOR operation on the single bit imaginary value ($I_1(k)$) from the converter 906 and the delayed single bit real value ($R_1(k-1)$) from the delay circuit 910. A summation circuit 914 adds the first and second correlation outputs from the first and second XOR circuits 904 and 908 to generate a pulse train over time having a duty cycle that is modulated by the frequency of the vibration induced excitation of the PES, and which therefore indicates the frequency of the vibration. The LPF 606 of FIG. 6 averages the pulse train from the summation circuit 914 to generate frequency values.

Referring again to FIG. 6, the amplitude detector 608 can generate an amplitude value A(k) based on a square root of the sum of the squares of the real and imaginary component values, as illustrated by the following equation:

$$A(k)=\sqrt{R^2(k)+I^2(k)}.$$

The frequency value is filtered by the LPF 606 and the amplitude value is filtered by the LPF 610 to reduce noise therein, such as due to noise in the PES that is misinterpreted as vibration induced excitation. Accordingly, filtering the frequency and amplitude values using the LPFs 606 and 610 may improve the stability of the servo controller 304 while it positions the head 20 so as to compensate for the detected frequency and amplitude of the vibration excitation of the head 20 and/or the disks 34.

Figure 10:
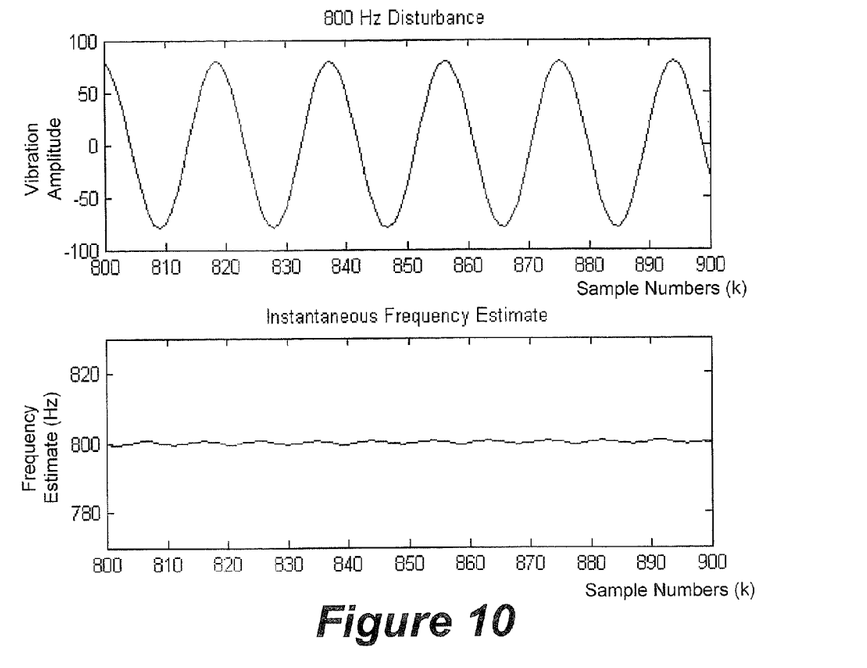
FIG. 10 illustrates two graphs, the top graph showing an 800 Hz vibration exciting the disk drive of FIG. 1 and appearing in a position error signal (PES), and the bottom graph showing a frequency estimate that is output by the frequency detection circuit of FIG. 4 in accordance with some embodiments.

Exemplary operation of the frequency detector 604 of FIG. 6 is now described with regard to the graphs shown in FIG. 10. The top graph shows an 800 Hz vibration that is exciting the disk drive 10 of FIG. 1, and which introduces a vibration component into the PES. The bottom graph shows estimated frequency values that may be output by the frequency detector 604. As shown in the bottom graph, the frequency values indicates that the vibration occurs at about 800 Hz.

Figure 11:
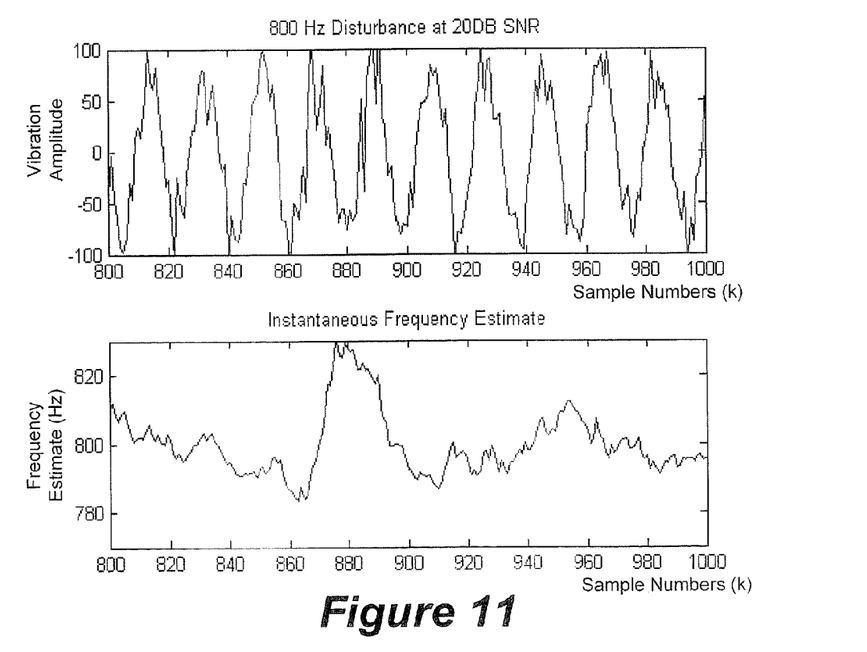
FIG. 11 illustrates two graphs, the top graph showing an 800 Hz vibration exciting the disk drive of FIG. 1 and appearing with a substantial noise component in the PES, and the bottom graph showing a frequency estimate that is output by the frequency detection circuit of FIG. 4 in accordance with some embodiments.

Further exemplary operation of the frequency detector 604 of FIG. 6 is described with regard to the graphs shown in FIG. 11. The top graph shows an 800 Hz vibration that is exciting the disk drive 10 and which appears with a substantial noise component in the PES. The bottom graph shows the estimated frequency values that may be output by the frequency detector 604, and which illustrates that the frequency detector 604 may properly indicate that the vibration frequency occurs at about 800 Hz in spite of the substantial noise component in the PES.

Figure 12:
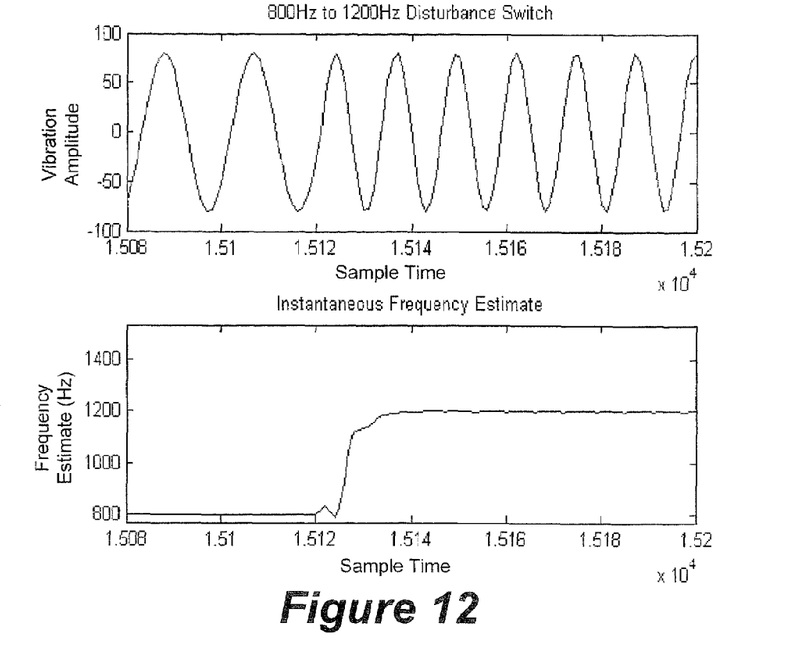
FIG. 12 illustrates two graphs, the top graph showing vibration exciting the disk drive of FIG. 1, where the vibration abruptly changes from 800 Hz to 1200 Hz, and the bottom graph showing a frequency estimate that is output by the frequency detection circuit of FIG. 4 in accordance with some embodiments.

Referring to FIG. 12, the top graph shows a vibration that is exciting the disk drive 10 and abruptly switches from 800 Hz to 1200 Hz. The bottom graph shows that the frequency detector 604 can track the time varying vibration contribution to the PES by generating about a 800 Hz frequency estimate between sample times $1.508 \times 10^4$ and about $1.512 \times 10^4$, and then abruptly increasing the frequency estimate to about 1200 Hz at about sample time $1.512 \times 10^4$.

Figure 13:
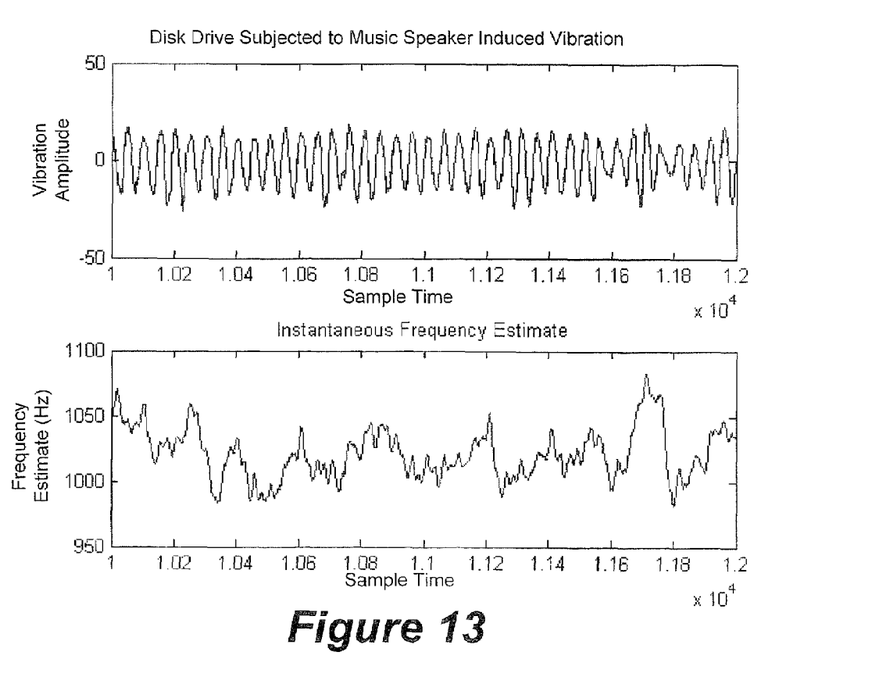
FIG. 13 illustrates two graphs, the top graph showing vibration from an operating music speaker exciting the disk drive of FIG. 1 and appearing in the PES, and the bottom graph showing a frequency estimate that is output by the frequency detection circuit of FIG. 4 in accordance with some embodiments.

Referring to FIG. 13, the top graph shows an excitation vibration of the disk drive 10 that is created by an adjacent speaker which is playing music. The bottom graph shows the corresponding frequency values that may be output by the frequency detector 604. Accordingly, the actuator control circuit 402 of FIG. 4 may control positioning of the head 20 in response to the detected frequency values so as to compensate for the speaker induced vibration of the head 20 and/or the disks 34.

Figure 14:
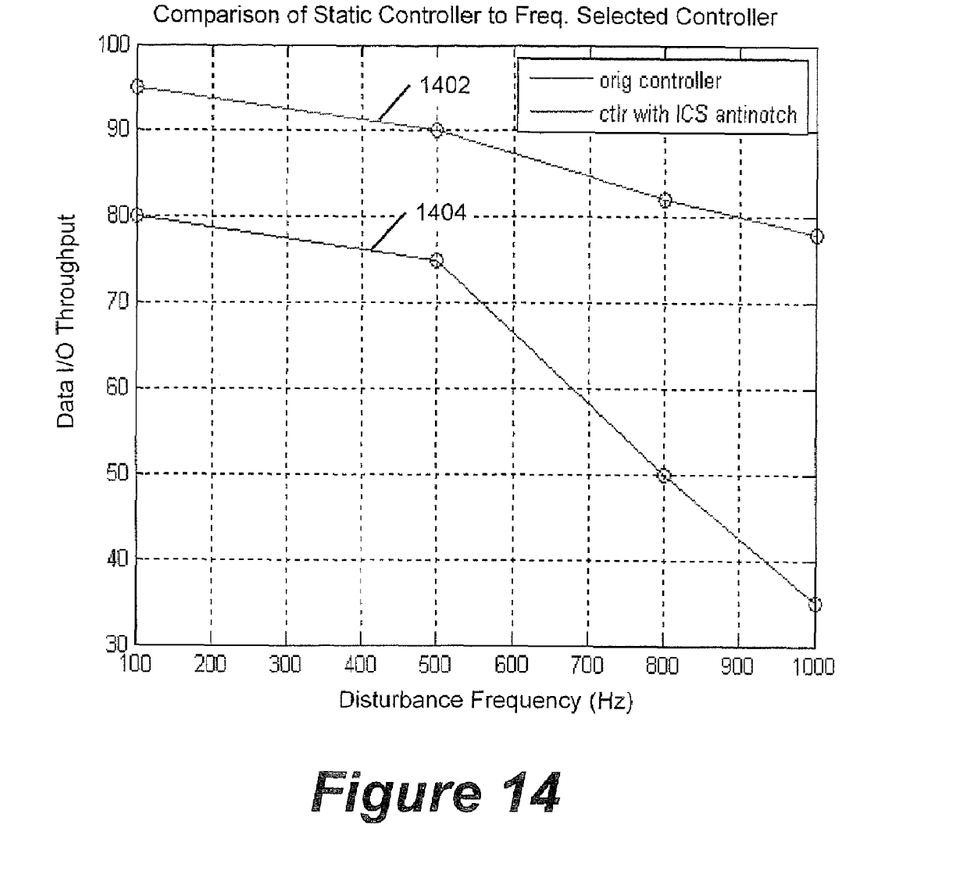
FIG. 14 illustrates two graphs, the top graph showing the operational input/output data throughput of a disk drive having a static controller that is excited by a range of vibration frequencies, and the bottom graph showing the operational input/output data throughput of the disk drive of FIG. 1 having a servo controller that adapts so as to compensate for the determined vibration frequency in accordance with some embodiments.

Referring to FIG. 14, the bottom curve 1404 shows the operational input/output data throughput of a disk drive that is excited by a range of vibration frequencies and which operates with a static controller that does not compensate for the time varying characteristics of the vibration frequencies. In sharp contrast, the top curve 1402 shows the operational input/output data throughput which may be provided by the disk drive 10 using the servo controller 304 to detect the frequency and amplitude of the vibration and to respond thereto so as to compensate for the vibration and improve the tracking of the head 20 relative to a selected track on the disk 34, and which may thereby improve input/output data throughput through the head 20.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method comprising:
    forming real and imaginary component signals from a position error signal (PES) indicative of a transducer location on a media;
    determining frequency of a vibration induced excitation of the PES in response to a product of the real and imaginary component signals at a second sample time and a complex conjugate of the real and imaginary component signals at an earlier first sample time; and controlling positioning of the transducer in response to the determined vibration frequency.

2. The method of claim 1, wherein the real and imaginary component signals are formed by carrying out a Hilbert transform on the PES.

3. The method of claim 1, wherein controlling position of the transducer comprises adapting an actuator control circuit by shifting location of at least one zero and pole of a transfer function of the actuator control circuit in response to the determined vibration frequency.

4. The method of claim 3, further comprising detecting amplitude of the vibration induced excitation of the PES, wherein an amount by which the at least one transfer function zero and pole is shifted toward the determined vibration frequency is regulated in response to the detected vibration amplitude.

5. The method of claim 1, wherein the frequency of the vibration induced excitation in the PES is detected in response to the following equation:

$$\arg[S(k)*\text{conjugate}(S(k-1))],$$

wherein $S(k)$ represents the real and imaginary component signals at a sample time k, $\text{conjugate}(S(k-1))$ represents a complex conjugate of the real and imaginary component signals at a sample time k−1, and arg represents a function that determines phase of the complex value product of $S(k)$ and $\text{conjugate}(S(k-1))$.

6. The method of claim 1, further comprising:

detecting amplitude of the vibration induced excitation of the PES in response to a square-root of the sum of squares of the real and imaginary component signals.

7. The method of claim 6, further comprising comparing the detected amplitude to at least one threshold value to determine when a change is made to how the least one actuator control circuit positions the transducer.

8. A method comprising:

forming real and imaginary component signals from a position error signal (PES) indicative of a transducer location on a media;

detecting frequency of a vibration induced excitation of the PES in response to the real and imaginary component signals; and controlling positioning of the transducer in response to selection among outputs of at least first and second actuator control circuits in response to the detected frequency of the vibration induced excitation of the PES, wherein the first actuator control circuit is configured to improve transducer track following under at least a threshold vibration and the second actuator control circuit is configured to improve transducer read/write throughput under less than the threshold vibration.

9. A method comprising:

forming real and imaginary component signals from a position error signal (PES) indicative of a transducer location on a media;

determining frequency of a vibration induced excitation of the PES by:

converting a value of the real component signal to a single logical bit real value;

converting a value of the imaginary component signal to a single logical bit imaginary value;

generating a time delayed single logical bit real value;

generating a time delayed single logical bit imaginary value;

generating a first correlation output in response to an exclusive-OR (XOR) of the single logical bit real value and the time delayed single logical bit imaginary value;

generating a second correlation output in response to an XOR of the single logical bit imaginary value and the time delayed single logical bit real value; and combining the first and second correlation outputs to generate a frequency signal that is indicative of the frequency of the vibration induced excitation of the PES; and controlling positioning of the transducer in response to the determined vibration frequency.

10. An apparatus comprising:

a circuit that forms real and imaginary component signals from a position error signal (PES) indicative of a transducer location on a media, determines frequency of a vibration induced excitation of the PES in response to a product of the real and imaginary component signals at a second sample time and a complex conjugate of the real and imaginary component signals at an earlier first sample time, and that controls positioning of the transducer in response to the determined vibration frequency.

11. The apparatus of claim 10, wherein the circuit carries out a Hilbert transform to form the real and imaginary component signals from the PES.

12. The apparatus of claim 10, wherein the circuit regulates positioning of the transducer in response to a transfer function which has a variable zero and pole location that is varied in response to the detected vibration frequency.

13. An apparatus comprising:

a circuit that forms real and imaginary component signals from a position error signal (PES) indicative of a transducer location on a media, wherein the circuit comprises a first exclusive-OR (XOR) circuit and a second XOR circuit, and the circuit determines frequency of a vibration induced excitation of the PES by converting a value of the real component signal to a single logical bit real value, converting a value of the imaginary component signal to a single logical bit imaginary value, generating a time delayed single logical bit real value, generating a time delayed single logical bit imaginary value, using the first XOR circuit to generate a first correlation output in response to an XOR of the single logical bit real value and the time delayed single logical bit imaginary value, using the second XOR circuit to generate a second correlation output in response to an XOR of the single logical bit imaginary value and the time delayed single logical bit real value, and combining the first and second correlation outputs to generate a frequency signal that is indicative of the frequency of the vibration induced excitation of the PES, and the circuit controls positioning of the transducer in response to the determined vibration frequency.

14. A servo controller comprising:

a vibration determination circuit that forms separate real and imaginary component signals from a position error signal (PES) indicative of a transducer location on a media, and determines frequency of a vibration induced excitation of the PES in response to the real and imaginary component signals; and an actuator compensator that controls positioning of the transducer in response to a transfer function which has a variable zero and pole location that is varied in response to the vibration frequency determined by the vibration determination circuit.

* * * * *